(12) United States Patent
Tomioka

(10) Patent No.: US 9,405,494 B2
(45) Date of Patent: Aug. 2, 2016

(54) APPARATUS AND METHOD FOR OUTPUTTING LAYOUT DATA ACCORDING TO TIMING INFORMATION, AND STORAGE MEDIUM

(71) Applicant: CANON KABUSHIKI KAISHA, Tokyo (JP)

(72) Inventor: Yu Tomioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/934,757

(22) Filed: Jul. 3, 2013

(65) Prior Publication Data

US 2014/0009793 A1  Jan. 9, 2014

(30) Foreign Application Priority Data

Jul. 9, 2012  (JP) ................................. 2012-153677

(51) Int. Cl.
*G06F 3/12* (2006.01)

(52) U.S. Cl.
CPC .............. *G06F 3/125* (2013.01); *G06F 3/1208* (2013.01); *G06F 3/1243* (2013.01); *G06F 3/1284* (2013.01)

(58) Field of Classification Search
USPC ................... 358/1.15, 1.18; 715/253
See application file for complete search history.

(56) References Cited

U.S. PATENT DOCUMENTS

2006/0220983 A1* 10/2006 Isomura et al. ................. 345/1.1
2010/0002258 A1*  1/2010 Shirai ........................... 358/1.15
2011/0283210 A1* 11/2011 Berger et al. .................. 715/765

FOREIGN PATENT DOCUMENTS

JP      P2007-310553 A    11/2007

OTHER PUBLICATIONS

Machine translation for JP 2007-310553, IDS, Nov. 29, 2007.*

* cited by examiner

*Primary Examiner* — Qian Yang
(74) *Attorney, Agent, or Firm* — Canon USA Inc. IP Division

(57) ABSTRACT

An apparatus includes an acquiring unit configured to acquire timing information indicating timing at with which an object to be arranged to a template is output and corresponds to a combination of a plurality of types of attributes of the object, a first selecting unit configured to select an object corresponding to the combination, based on output timing at with which layout data is output and the timing indicated by the timing information acquired by the acquiring unit, a second selecting unit configured to select a template corresponding to at least one type of an attribute among the plurality of types, and an outputting unit configured to generate layout data with which the object selected by the first selecting unit is arranged to the template selected by the second selecting unit, and to output the generated layout data.

25 Claims, 17 Drawing Sheets

FIG. 4

| | EXAMPLE OF DATA |
|---|---|
| 401 IMAGE FILE PATH | C:¥Image¥IMG_0001.JPG |
| 402 PHOTOGRAPHING DATE INFORMATION | 2012/1/1 |
| 403 FAVORITE SETTING INFORMATION | 3 |
| 404 SAME PERSON PROFILE INFORMATION | 1000 |
| 405 EVENT INFORMATION | 2000 |
| 406 NUMBER OF TIMES OF VIEWING | 10 |
| 407 NUMBER OF TIMES OF PRINTING | 3 |

FIG. 6

| | EXAMPLE OF DATA |
|---|---|
| PERSON NAME (601) | TARO SUZUKI |
| DATE OF BIRTH (602) | 2010/1/1 |
| RELATIONSHIP (603) | SON |

FIG. 7

| | EXAMPLE OF DATA |
|---|---|
| EVENT NAME | CHERRY BLOSSOM VIEWING WITH FAMILY |
| EVENT CATEGORY | TRAVEL |
| EVENT OCCURRENCE DATE | 2012/4/1 |

| ID | IMAGE LAYOUT DATA GENERATION CONDITION ||||
| | TARGET PERSON | EVENT | NUMBER OF PHOTOGRAPHED IMAGES | TIMING INFORMATION |
| --- | --- | --- | --- | --- |
| 001 | FATHER | BIRTHDAY | | ONE MONTH BEFORE AND AFTER BIRTHDAY, YEAR NOT CONSIDERED |
| 002 | MOTHER | BIRTHDAY | | ONE MONTH BEFORE AND AFTER BIRTHDAY, YEAR NOT CONSIDERED |
| : | | | | |
| 011 | SON | GRADUATION CEREMONY | | ONE MONTH AFTER GRADUATION CEREMONY, ONE YEAR NOT CONSIDERED |
| : | | | | |
| 021 | — | TRAVEL | | TWO MONTHS AFTER TRAVEL, YEAR NOT CONSIDERED |
| : | | | | |
| 999 | — | — | 50 OR MORE IMAGES ON SAME PHOTOGRAPHING DATE | |

FIG. 11

| PRIORITY | EVALUATION ITEM |
|---|---|
| 1 | RATING OF IMAGE FILE |
| 2 | NUMBER OF TIMES OF PRINTING IMAGE FILE |
| 3 | NUMBER OF TIMES OF VIEWING IMAGE FILE |
| 4 | PHOTOGRAPHING DATE/TIME INFORMATION |

FIG. 15

| PRINTER INFORMATION | IMAGE TEMPLATE SELECTION CRITERION |
|---|---|
| CORRESPONDING SHEET SIZE | SELECT IMAGE TEMPLATE CORRESPONDING TO SHEET SIZE COMPATIBLE WITH PRINTER |
| SHEET SIZE HAVING PRINTING HISTORY | SELECT IMAGE TEMPLATE CORRESPONDING TO SHEET SIZE HAVING USE HISTORY IN PRINTING BY USER IN PAST |
| AMOUNT OF REMAINING INK | SELECT IMAGE TEMPLATE MAINLY USING INK WITH SUFFICIENT REMAINING AMOUNT IN PRINTER |

FIG. 16

| ID | LAYOUT DATA GENERATION CONDITION ||||
| | TARGET PERSON | EVENT CATEGORY | EVENT NAME | NUMBER OF PHOTOGRAPHED IMAGES | TIMING INFORMATION |
| --- | --- | --- | --- | --- | --- |
| 001 | FATHER | BIRTHDAY | | | ONE MONTH BEFORE AND AFTER BIRTHDAY, YEAR NOT CONSIDERED |
| 002 | MOTHER | BIRTHDAY | | | ONE MONTH BEFORE AND AFTER BIRTHDAY, YEAR NOT CONSIDERED |
| ⋮ | | | | | |
| 011 | SON | GRADUATION CEREMONY | | | ONE MONTH AFTER GRADUATION CEREMONY, ONE YEAR CONSIDERED |
| ⋮ | | | | | |
| 021 | — | TRAVEL | | | TWO MONTHS AFTER TRAVEL, YEAR NOT CONSIDERED |
| ⋮ | | | | | |
| 999 | — | — | | 50 OR MORE IMAGES ON SAME PHOTOGRAPHING DATE | |
| 1000 | — | TRAVEL | CHERRY BLOSSOM VIEWING WITH FAMILY | | ONE MONTH AFTER EVENT OCCURRENCE, YEAR NOT CONSIDERED |

APPARATUS AND METHOD FOR OUTPUTTING LAYOUT DATA ACCORDING TO TIMING INFORMATION, AND STORAGE MEDIUM

BACKGROUND OF THE INVENTION

1. Field of the Invention

The present invention relates to an apparatus and a method for outputting layout data in which an object is arranged on a template, and a storage medium.

2. Description of the Related Art

There are techniques for arranging an image owned by a user, such as a photograph photographed by a digital camera, to a template.

Japanese Patent Application Laid-Open No. 2007-310553 describes a technique for displaying a layout image corresponding to a start time and date when a layout image generation program has started. More specifically, Japanese Patent Application Laid-Open No. 2007-310553 describes the technique for determining date/time information or event information corresponding to the start time and date, and generating a layout image using an image and a template including the date/time information or the event information.

The technique described in Japanese Patent Application Laid-Open No. 2007-310553, however, uses either one of the date/time information and the event information corresponding to the date and time when the layout image generation program has started, to select an image and a template including the information. Thus, it may not be possible to select an appropriate image or an appropriate template in some cases.

If an image and a template are selected based only on the date/time information, the image and the template are selected regardless of in what kind of event the image has been photographed at the date and time indicated by the date/time information. Thus, for example, if there are a plurality of events on the same date, images of the plurality of events may be selected in a mixed manner.

In addition, if an image and a template are selected based only on the event information, the image and the template may be selected that are inappropriate for the date and time of outputting the layout image. For example, the case is considered of an event of which date varies by individual, such as a birthday. An image and a template related to a birthday are selected even if it is the birthday of a particular person. Thus, an image and a template related to a person other than a desired person may be selected.

SUMMARY OF THE INVENTION

The present invention relates to an image processing apparatus and an image processing method that are capable of outputting layout data in which an object appropriate for an output timing of the layout data is arranged on an appropriate template, and a storage medium.

According to an aspect of the present invention, an apparatus includes an acquiring unit configured to acquire timing information indicating timing at with which an object to be arranged to a template is output and corresponds to a combination of a plurality of types of attributes of the object, a first selecting unit configured to select an object corresponding to the combination, based on output timing at with which layout data is output and the timing indicated by the timing information acquired by the acquiring unit, a second selecting unit configured to select a template corresponding to at least one type of an attribute among the plurality of types, and an outputting unit configured to generate layout data with which the object selected by the first selecting unit is arranged to the template selected by the second selecting unit, and to output the generated layout data.

Further features of the present invention will become apparent from the following description of exemplary embodiments with reference to the attached drawings.

BRIEF DESCRIPTION OF THE DRAWINGS

FIG. 4 depicts example information to be registered in an image database.

FIG. 6 illustrates settings of a person profile with respect to an image group.

FIG. 7 illustrates settings of event information with respect to date/time information.

FIG. 8 illustrates an example of a layout data generation condition.

FIG. 11 illustrates examples of evaluation items to be used to select a layout data generation condition.

FIG. 15 illustrates examples of printer information and template selection criterion based on the printer information.

FIG. 16 illustrates a layout data generation condition in which keywords are registered by a user.

DESCRIPTION OF THE EMBODIMENTS

Various exemplary embodiments, features, and aspects of the invention will be described in detail below with reference to the drawings. The exemplary embodiments which will be described below do not restrict to the invention according to the claims. All of combinations of the features described in the exemplary embodiments are not always essential to the means for solution according to the invention.

Figure 1:
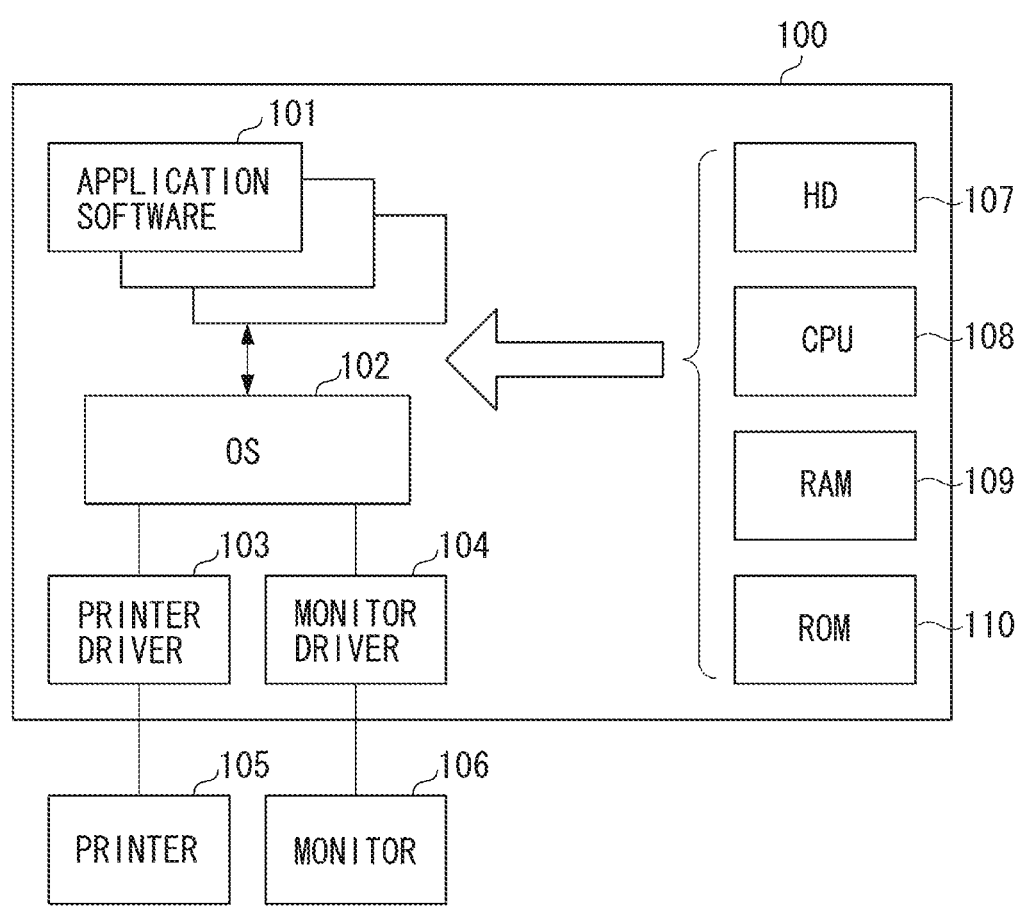
FIG. 1 is a block diagram illustrating an exemplary configuration of a host computer.

FIG. 1 is a block diagram illustrating a configuration of a host computer 100 which is an example of an apparatus according to the present invention.

As illustrated in FIG. 1, the host computer 100 is connected to a printer 105 and a monitor 106. The host computer 100 includes application software 101 for generating layout data according to the present exemplary embodiment. The application software 101 issues a group of various rendering process commands (an image rendering command, a text rendering command, and a graphics rendering command) indicating an output image, and inputs the group of various rendering process commands to a monitor driver 104 via an operating system (OS) 102. The monitor driver 104 then causes the monitor 106 to display an image corresponding to the various rendering process commands issued by the application software 101. In a case of printing the image, the application software 101 inputs the group of rendering commands to a printer driver 103 via the OS 102. The printer driver 103 is software for processing the group of rendering commands to generate print data, and causing the printer 105 to print an image corresponding to the print data.

To store and operate the above-described software, the host computer 100 includes hardware such as a central processing unit (CPU) 108, a hard disk (HD) 107, a random access memory (RAM) 109, a read-only memory (ROM) 110, and so on. The host computer 100 is also connected to operation devices (a mouse, a keyboard, a touch panel, and the like) (not illustrated).

The HD 107 and the ROM 110 store various types of data and programs. When a program corresponding to the application software 101 is stored in the HD 107 or the ROM 110, the application software 101 is installed into the host computer 100. The HD 107 and the ROM 110 also store a program corresponding to the OS 102 and programs corresponding to the printer driver 103 and the monitor driver 104.

In response to an instruction issued by a user and input to the host computer 100 via any of the operation devices, the CPU 108 loads the above-described programs stored in the HD 107 and the ROM 110 into the RAM 109 to execute the programs. Accordingly, functions of the application software 101, the OS 102, the printer driver 103, and the monitor driver 104 can be achieved. An instruction issued by a user may be input to the host computer 100 not only via the operation devices but also via a touch panel.

In addition, in the host computer 100, the application software 101 generates various types of data to be output. Examples of the types of data to be output include text data categorized into text such as characters, graphics data categorized into graphics such as figures, and image data categorized into photographic images. As output processing of the various types of data, it is possible, for example, to display output image data on the monitor 106, output the output image data to the printer 105, and transmit the output image data to an external apparatus. When the printer 105 is caused to print an image based on the output image data, the application software 101 makes a print output request to the OS 102. At this time, the application software 101 issues to the OS 102 a group of rendering commands in which a text data portion is formed by a text rendering command, a graphics data portion is formed by a graphics rendering command, and an image data portion is formed by an image rendering command.

According to the present exemplary embodiment, the host computer 100 illustrated in FIG. 1 arranges an object such as an image on a template according to the program corresponding to the application software 101, so that a layout image is generated.

Figure 2:
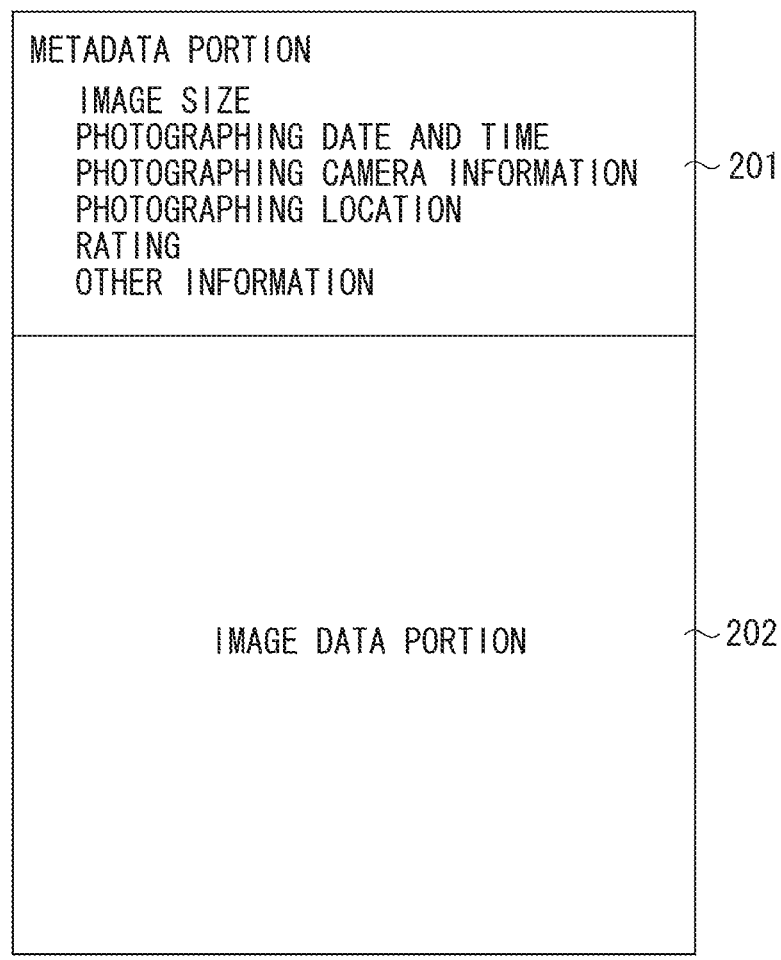
FIG. 2 illustrates a structure of an image file.

FIG. 2 illustrates a structure of an image file of an image to be arranged on a template. According to the present exemplary embodiment, an image file of an image to be arranged is an image file of an image photographed by a digital camera. If the image file of the image photographed by the digital camera is based on, for example, the exchangeable image file format (Exif) standard, the image file includes an image data portion 202 together with a metadata portion 201 which is information regarding the image. In the metadata portion 201, information pieces such as an image size (the number of pixels), a photographing date and time, photographing camera information, a photographing location, and a rating are recorded. The rating is a result of an evaluation of the image data portion 202. The evaluation result is recorded according to the states of exposure and focus during the photographing of the image by the digital camera or in image editing application software. Further, a user can manually set the evaluation result. According to the present exemplary embodiment, it is also possible to deal with an image file not including the metadata portion 201 illustrated in FIG. 2. For example, it is possible to use time stamp information included in the image file, instead of the photographing date and time included in the metadata portion 201.

Figure 3:
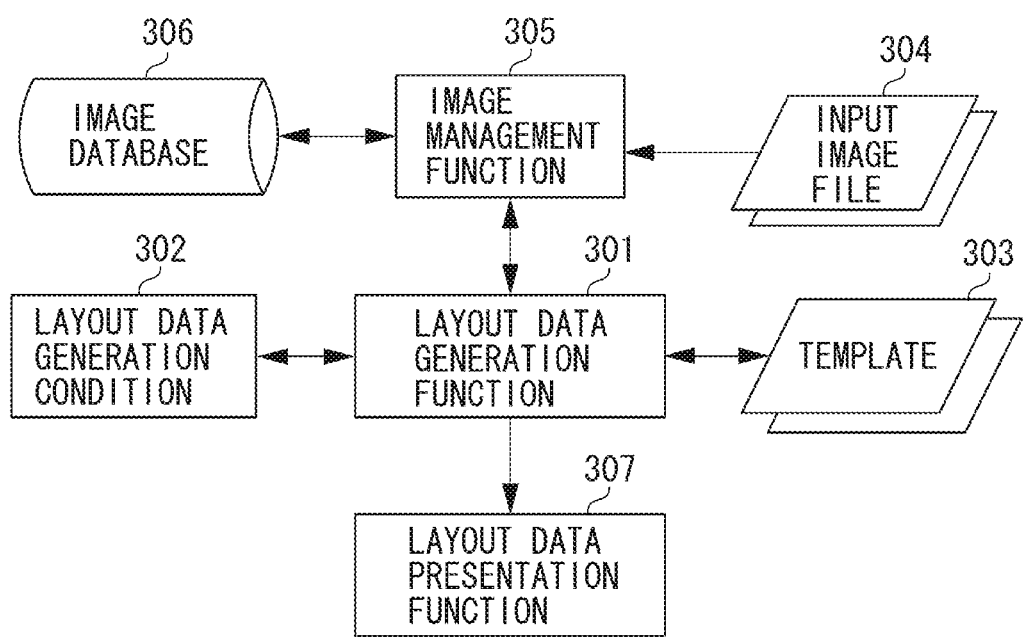
FIG. 3 illustrates a layout data generation program.

FIG. 3 illustrates the functions of the application software 101.

An image management function 305 has a function of loading an input image file 304 (the image file illustrated in FIG. 2) into the host computer 100. The input image file 304 is stored in an internal memory (e.g., the HD 107) of the host computer 100 in FIG. 1, or stored in a memory of a device connected to the host computer 100. The image management function 305 loads the input image file 304 therein from either of these memories.

The image management function 305 has a function of managing the input image file 304 including the metadata portion 201 and the image data portion 202 together with information in an image database 306 illustrated in FIG. 4. The image database 306 is created in the HD 107 or the RAM 109.

The image management function 305 also has a function of extracting a person included in the image of the input image file 304. Thus, the image management function 305 can create a group with respect to each person included in an image, and categorize a plurality of images into the created groups in the image database 306. When performing the grouping processing, the image management function 305 analyzes the image data portion 202 of the input image file 304, and if a person is included in the image, performs face detection. Then, the image management function 305 categorizes the image by the feature amount of the face calculated based on the detection. Thus, the image management function 305 can group a plurality of images with respect to each person.

The image management function 305 also has a function of grouping image files with respect to each photographing date in the image database 306 based on the photographing date information included in the metadata portion 201 of the input image file 304. The details of the image file grouping processing performed by the image management function 305 will be described with reference to FIG. 5.

A layout data generation function 301 arranges an image stored in the image database 306 on a template 303 to generate layout data. The layout data generation function 301 selects a template to be output and an image to be output according to a layout data generation condition 302.

The template 303 is an image in which an image of an image file is arranged. The HD 107 or the ROM 110 stores a plurality of templates among which a template to be output is selected. The layout data generation condition 302 is a condition for an image to be arranged or a template on which an image is arranged when the layout data generation function 301 generates layout data. The layout data generation function 301 selects an image from the image database 306 or a template from among the plurality of templates according to the layout data generation condition 302. The details of the processing of selecting an image and a template to be output will be described below with reference to FIGS. 10 and 12.

A layout data presentation function 307 has a function of outputting layout data generated by the layout data generation function 301 and presenting the layout data in such a form as to be recognized by a user. For example, the layout data presentation function 307 outputs, via the OS 102 and the printer driver 103, layout data to the printer 105 connected to the host computer 100, and causes the printer 105 to print an image corresponding to the layout data. Alternatively, the layout data presentation function 307 outputs, via the OS 102 and the monitor driver 104, layout data to the monitor 106 connected to the host computer 100, and causes the monitor 106 to display an image corresponding to the layout data.

According to the present exemplary embodiment, the layout data generation function 301 obtains date/time information regarding the time when the layout data presentation function 307 outputs layout data, and the layout data generation function 301 selects an image and a template to be output according to the date/time information. At this time, the layout data generation function 301 selects a template by combining a plurality of conditions corresponding to the date and time (an event and a person corresponding to the date and time). Thus, the layout data generation function 301 can select, among various images and templates, an appropriate template corresponding to the date and time of outputting the layout data.

Next, the functions illustrated in FIG. 3 are described in detail.

Figure 5:
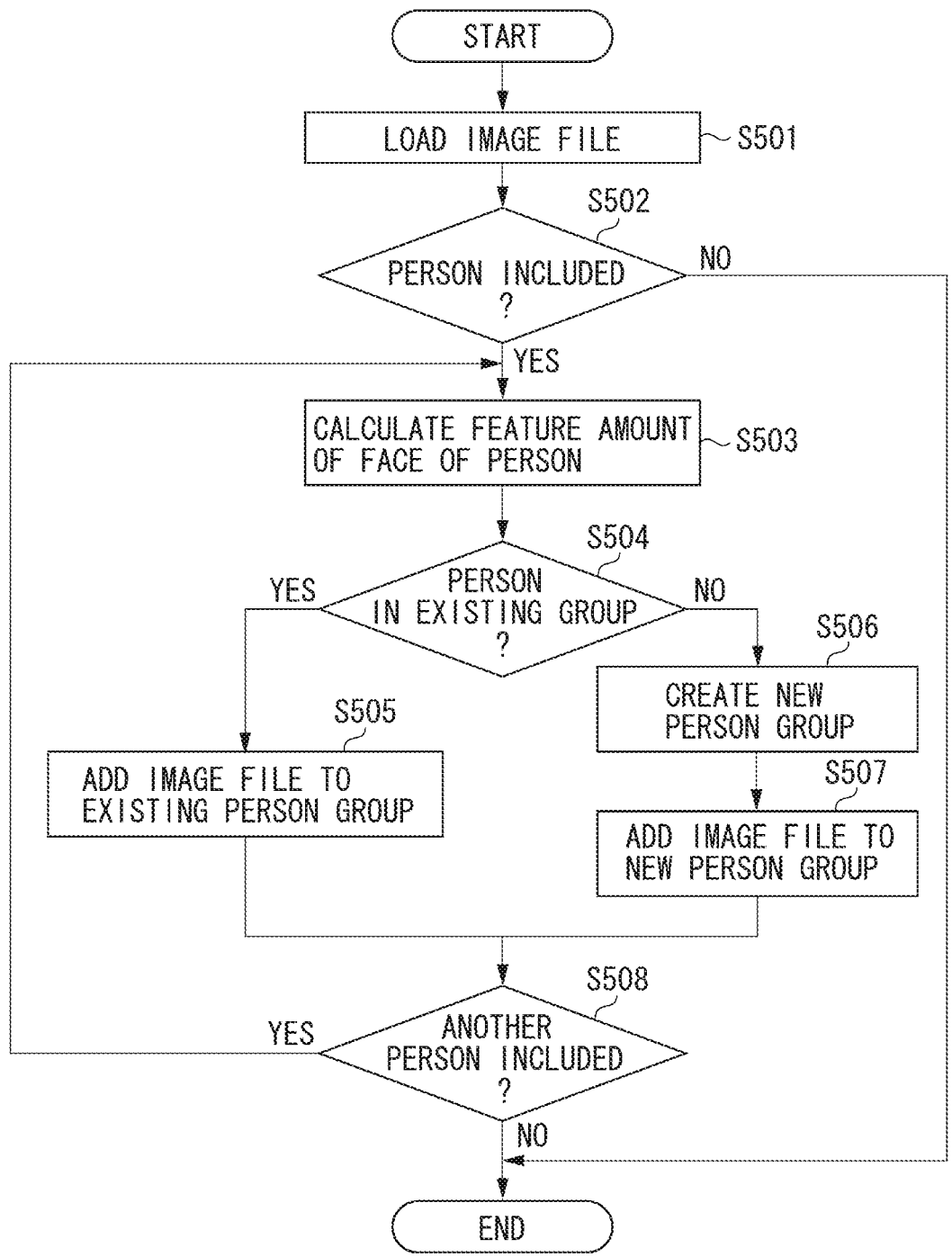
FIG. 5 is a flow chart illustrating image grouping processing.

FIG. 5 is a flow chart illustrating the image file grouping processing performed by the image management function 305 illustrated in FIG. 3. This processing is achieved by the CPU 108 executing a program corresponding to the image management function 305 in FIG. 3 which is stored in the HD 107 or the ROM 110.

In step S501, the image management function 305 loads the input image file 304.

Then, in step S502, the image management function 305 determines whether a person is included in the image of the loaded image file. In the determination of whether a person is included in step S502, the image management function 305 analyzes the image data in the image file to detect an area corresponding to a person's face. As a result of the detection, if an area corresponding to a face (i.e., face area) is included, the image management function 305 stores in the RAM 109 the face area in the image on the assumption that a person is included in the image. If a plurality of face areas is detected at this time, the image management function 305 stores in the RAM 109 each of the plurality of face areas in the image on the assumption that a plurality of people is included in the image. If the image management function 305 determines that no person is included in the image (NO in step S502), the image management function 305 stores the image in the RAM 109 on the assumption that no person is included in the image file.

In step S502, if the image management function 305 determines that a person is included (YES in step S502), then in step S503, the image management function 305 calculates a feature amount of the face of the person. The image management function 305 can use a value obtained in the face detection processing in step S502 as the feature amount of the face. Then, in step S504, the image management function 305 compares the feature amount of the face calculated in step S503 with the feature amounts of the faces of the people in the image files included in existing groups, and determines whether the person included in the image file to be processed is a person in any of the existing groups.

In step S504, if the image management function 305 determines that the person in the image file to be processed is a person corresponding to any of the existing groups (YES in step S504), then in step S505, the image management function 305 adds the image file to the existing image file group.

Whereas if the image management function 305 determines that the person in the image file to be processed is not a person corresponding to any of the existing groups (NO in step S504), then in step S506, the image management function 305 creates a new person image file group. Then, in step S507, the image management function 305 adds the image file to be processed to the person image file group created in step S506.

After adding the image file to the group in step S505 or S507, then in step S508, the image management function 305 determines whether another person other than the person processed in steps 504 to 507 is included in the image file. In step S508, if a plurality of faces is detected in step S502, the image management function 305 determines that another person is included in the image file. Then, the image management function 305 repeats the processing in steps S503 to S507 until the image management function 305 executes the processing in steps 503 to 507 on all of the plurality of face areas stored in the RAM 109 in step S502.

According to the above-described processing illustrated in FIG. 5, image files are managed with respect to each group in the image database 306. In the example illustrated in FIG. 5, the image management function 305 groups image files with respect to each person. The image management function 305, however, groups image files also with respect to each photographing date.

The image management function 305 manages image files in the image database 306 as described above, and also manages ancillary information indicating the attributes of each image file in the image database 306. When generating layout data, the layout data generation function 301 identifies an image to be arranged on a template with reference to the ancillary information.

FIG. 4 illustrates the ancillary information registered in the image database 306.

An image file path 401 is path information including a storage location and a file name of an image file. An image file is generated in the HD 107 or the RAM 109, and therefore, the image file path 401 indicates an area in the HD 107 or the RAM 109.

Photographing date information 402 indicates a photographing date of the image. The photographing date information 402 is obtained based on the photographing date included in the metadata portion 201 in FIG. 2. If the photographing date information is not included in the Exif data in the image file, the last update date recorded in a time stamp of the image file may be used as the photographing date.

Favorite setting information 403 indicates an evaluation of the image provided by a user. For example, the rating included in the metadata portion 201 in FIG. 2 is used as the favorite setting information 403. If a user evaluates the image in an application of a digital camera or a personal computer, the metadata portion 201 stores the rating indicating the evaluation. Thus, the stored rating may be used as the favorite setting information 403. Alternatively, if the user evaluates the image using the application software 101, the evaluation may be used as the favorite setting information 403.

Same person profile information 404 is identification (ID) information for identifying a person included in the image. According to the present exemplary embodiment, an image including a particular person is regarded as a target to be arranged on a template. At this time, a person included in the image can be identified by identifying profile information associated with the ID information with reference to the profile information 404. The details of the content of the profile information will be described below.

Event information 405 is ID information for identifying an event (a birthday, a graduation ceremony, or the like) related to the image. According to the present exemplary embodiment, an image of a particular event is regarded as a target to be arranged on a template. At this time, an event corresponding to the image can be identified by identifying event information associated with the ID information with reference to the event information 405. The details of the content of the event information will be described below.

The number of times of viewing 406 represents the number of output times the user has viewed the target image. The number of times of printing 407 represents the number of output times the user has printed the target image. If one image is viewed with a viewer of the application software 101, or a print instruction to print one image is issued, the corresponding number of times is counted and stored in a memory area assigned to the application software 101. With reference to the corresponding number of times stored in the memory area, the image management function 305 can obtain the number of times of viewing 406 or the number of times of printing 407. In addition, if the metadata portion 201 of an image file stores the number of times of viewing the image file and the number of times of printing the image file, the image management function 305 may refer to this information.

FIG. 6 illustrates an example of the person profile information identified by the same person profile information 404 in the ancillary information illustrated in FIG. 4. The profile information is set according to an instruction issued by a user. To set the profile information, for example, the application software 101 causes the monitor 106 to display images in the image database 306 with respect to each person group. Then, the user can perform a setting operation on each person group using any of the operation devices, so that the profile information can be set with respect to the person group.

A person name 601 represents the name of a person included in the image or a character string for identifying the person. A date of birth 602 indicates the date of birth of the person included in the image. A relationship 603 represents the relationship between the person included in the image and the user, and represents, for example, "son", "mother", "granddaughter", or "friend". The relationship 603 is set by the user selecting any one of a plurality of predetermined options for relationships in the application software 101.

FIG. 7 is an example of the event information identified by the event information 405 in the ancillary information illustrated in FIG. 4. The event information is also set according to an instruction issued by the user in a similar manner to the profile information. An event name 701 represents the name of an event or a character string for the user to identify the event. An event category 702 represents the category of the event, for example, "travel", "graduation ceremony", or "hobby". An event occurrence date 703 represents date information regarding the period during which the event has occurred. The user can register an event over a plurality of dates, or can register a plurality of events on the same photographing date.

ID information for identifying the profile information illustrated in FIG. 6 and the event information illustrated in FIG. 7 is set for the person group and the photographing date group of the image, and is further set for the images included in each group. As a result, the ID information for identifying the profile information set by the user is stored in the ancillary information corresponding to each image included in the groups. The profile information can be set not only for the groups, but also for each image individually by the user.

According to the present exemplary embodiment, the layout data generation function 301 generates layout data, and the layout data presentation function 307 presents the layout data to the user. At this time, based on the presentation date and time of the layout data and the layout data generation condition 302, the layout data generation function 301 determines a template to be used in the layout data and an image to be arranged on the template.

More specifically, in the layout data generation condition 302, a condition for specifying a person and an event is set. The layout data generation function 301 obtains the template 303 corresponding to the person and the event specified by the condition. Further, based on the ancillary information illustrated in FIG. 4, the layout data generation function 301 obtains an image corresponding to the person and the event specified by the condition, with reference to the image database 306.

FIG. 8 illustrates an example of the layout data generation condition 302.

In the layout data generation condition 302, a plurality of conditions for identifying a template and an image to be used to generate layout data are stored, and an ID is assigned to each condition. In each condition, at least one of items, namely a person, an event, and the number of photographed images, is set. Each condition can also include timing information. The above-described items do not need to be set in each processing. Thus, an item which is not set in processing is not used for a condition.

Figure 9:
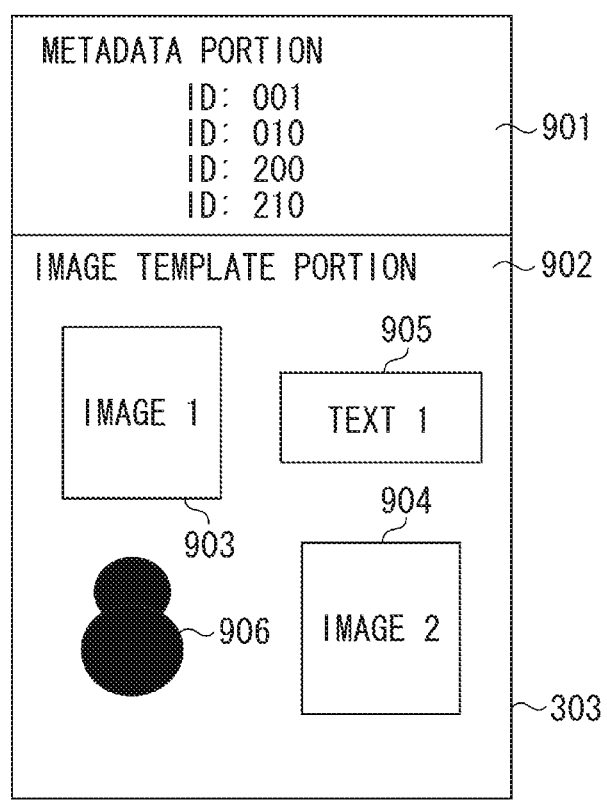
FIG. 9 illustrates a data structure of a template.

With reference to the ancillary information of an image file, the layout data generation function 301 obtains from the template 303 a template corresponding to a condition stored in the layout data generation condition 302. Each template includes IDs corresponding to respective conditions as illustrated in FIG. 9. Thus, the layout data generation function 301 obtains a template including the ID corresponding to the condition. The details of a file configuration of a template will be described below. Further, based on the ancillary information illustrated in FIG. 4, the layout data generation function 301 also obtains an image corresponding to the condition from the image database 306.

The timing information represents the timing at which layout data is generated. For example, if the layout data generation function 301 generates layout data according to the date and time when the layout data is output and presented to the user, the layout data generation function 301 identifies from the layout data generation condition 302 a condition including the timing information according to the presentation date and time.

The layout data generation function 301 compares the person, the event, and the number of photographed images in the condition of each ID included in the layout data generation condition 302, with the ancillary information of the image file, and determines whether there is an image that matches the condition. Further, the layout data generation function 301 compares the event date and time identified by the ancillary information and the timing information with the current date and time, and determines whether the condition corresponds to the current date and time.

For example, the condition of an ID 001 in FIG. 8 is such that the target person is "father", the event is "birthday", and the timing information is "one month before and after birthday, year not considered". In response, the layout data generation function 301 confirms the ancillary information of each image file in the image database 306, and confirms whether the image database 306 stores an image of which person profile information is "father" and event is "birthday". If the image database 306 stores such an image, the layout data generation function 301 confirms, based on the date of birth in the profile information, whether the current date and time is within one month before or after the birthday of the "father". If the current date and time is within one month before or after the birthday of the "father", the layout data generation function 301 determines an image file included in a group for the relationship "father" and corresponding to the event "birthday", as a target to be arranged on a template. At this time, the timing information describes "year not considered", and therefore, the layout data generation function 301 does not consider the year in the comparison of the date of birth with the current date and time. Thus, the condition is matched one month before and after the birthday of the "father" every year, and therefore, the layout data generation function 301 generates this layout data one month before and after the birthday of the father every year.

The condition of an ID 011 in FIG. 8 is such that the target person is "son", the event is "graduation ceremony", and the timing information is "one month after graduation ceremony, one year considered". Thus, the layout data generation function 301 determines, using the ancillary information of the image file, whether the relationship "son" is registered as the person profile information. If the relationship "son" is registered, the layout data generation function 301 confirms whether the event "graduation ceremony" is registered as the event information in the ancillary information. If, as a result of thus confirming the ancillary information, the layout data generation function 301 determines that there is an image corresponding to "son" and "graduation ceremony", the layout data generation function 301 confirms the timing information. The timing information is "one month after graduation ceremony", and therefore, the layout data generation function 301 compares the event occurrence date in the event information with the current date and time, and determines whether the current date and time is within one month after the date of the graduation ceremony. In addition, the timing information describes "one year considered", and therefore, the layout data generation function 301 determines that the current date and time matches the timing information in the event occurrence year and until the following year. The layout data generation function 301, however, will determine that the current date and time does not match the timing information in the second and subsequent years. If the layout data generation function 301 determines as a result that the current date and time matches the timing information, the layout data generation function 301 generates layout data.

In addition, as in the condition of an ID 999 in FIG. 8, it is possible to describe only the number of photographed images, such as "50 or more images on same photographing date". With this condition, if the number of images of the same photographing date exceeds a predetermined number regardless of registration information regarding people and events, generation of layout data can be performed using images of the same photographing date.

The layout data generation condition 302 may be stored in the host computer 100, or may be stored in an external apparatus capable of communicating with the host computer 100, as a text file described, for example, in the extensible markup language (XML) format. In this case, the layout data generation condition 302 is appropriately transmitted from the external apparatus to the host computer 100. For example, when the layout data generation function 301 generates layout data, or when the application software 101 is started, the host computer 100 obtains the layout data generation condition 302 from the external apparatus. If the layout data generation condition 302 is thus stored in the external apparatus, it is easy to replace or edit data.

As described with reference to FIGS. 3 to 8, the layout data generation function 301 identifies an image that matches a condition using the ancillary information of each image file and the layout data generation condition 302. Further, according to the present exemplary embodiment, the layout data generation function 301 evaluates an image and determines a condition corresponding to an image having a high evaluation as a condition for generating layout data.

Figure 10:
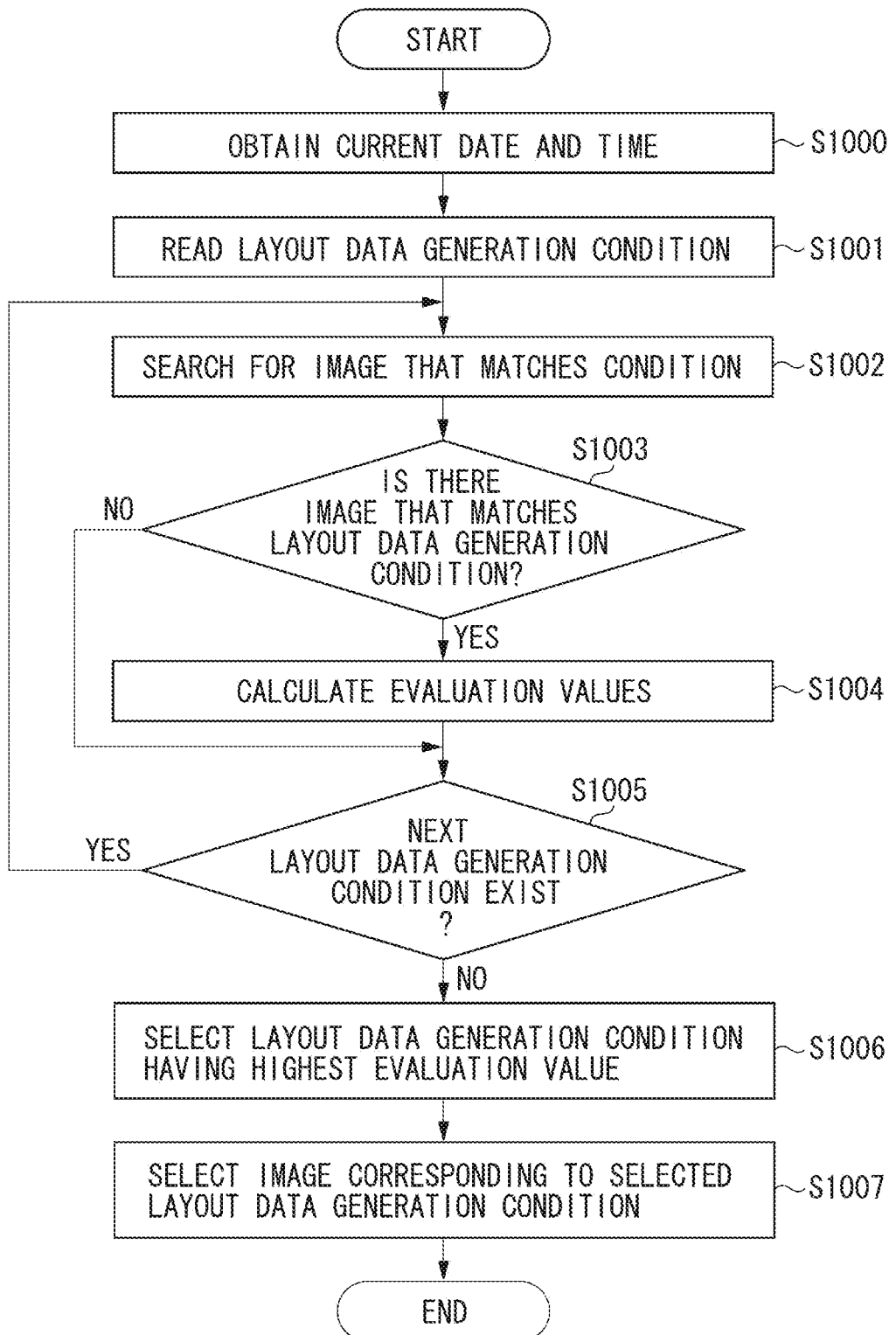
FIG. 10 is a flow chart illustrating an example of image selection processing.

FIG. 10 is a flow chart illustrating processing for selecting a condition for generating layout data by the layout data generation function 301 illustrated in FIG. 3. This process is achieved by the CPU 108 executing a program corresponding to the layout data generation function 301 in FIG. 3 which is stored in the HD 107 or the ROM 110.

In step S1000, the layout data generation function 301 obtains the current date and time. The layout data generation function 301 may obtain the current date and time determined by a clock function of the application software 101, or may obtain the current date and time determined by, for example, a clock function of the OS 102 or another application.

In step S1001, the layout data generation function 301 reads the layout data generation condition 302. If the layout data generation condition 302 is stored in the HD 107 or the ROM 110 in the host computer 100, the layout data generation condition 302 is loaded from the memory of the HD 107 or the ROM 110 into the RAM 109. Alternatively, if the layout data generation condition 302 is stored in an external apparatus, the processing for receiving the layout data generation condition 302 from the external apparatus is performed.

The processing in steps 1002 to 1005 is executed with respect to each of a plurality of conditions in the layout data generation condition 302. In step S1002, the layout data generation function 301 compares one of the layout data generation conditions to be processed, with ancillary information in the image database 306, and searches for one or a plurality of images corresponding to the layout data generation condition. More specifically, the layout data generation function 301 searches for one or a plurality of images corresponding to attributes of an image (a person and an event) in the layout data generation condition and of which date and time (the birthday or the event occurrence date) of the attributes of the image (the person and the event) matches the current date and time obtained in step S1000 and the timing information.

In step S1003, the layout data generation function 301 determines whether there is an image file that matches one of the layout data generation conditions to be processed.

In step S1003, if the layout data generation function 301 determines that there is an image file that matches the layout data generation condition (YES in step S1003), then in step S1004, the layout data generation function 301 calculates the evaluation values of the image using the ancillary information of the image file.

FIG. 11 illustrates examples of evaluation items used in the evaluation value calculation processing in step S1004. According to the present exemplary embodiment, as the evaluation values of the image file corresponding to the layout data generation condition to be processed, the layout data generation function 301 calculates the rating of the image file, the number of times of printing the image file, the number of times of viewing the image file, and the photographing date and time of the image file. As illustrated in FIG. 4, the ancillary information includes the favorite setting, the number of times of printing, the number of times of viewing, and the photographing date and time. Thus, with reference to the ancillary information corresponding to the image file, the layout data generation function 301 can obtain the evaluation value of the image file with respect to each evaluation item.

When evaluation values of an image file are thus set, an image file having a high evaluation in "rating", and an image file having a large number of times in "the number of times of printing" or "the number of times of viewing" are determined as an image file having a high evaluation value. Further, in "photographing date and time", an image file having a new date and time when the image has been photographed is determined as an image file having a high evaluation value. If a plurality of image files corresponding to the layout data generation condition are found in the search in step S1002, a combination of images far from each other in "photographing date and time" among the plurality of image files is determined as a combination of image files having a high evaluation value.

The rating of the image file, the number of times of printing the image file, and the number of times of viewing the image file are evaluated based on the respective average values of the ratings, the numbers of times of printing, and the numbers of times of viewing of the plurality of image files. Regarding to the evaluation based on the rating, the image file to which a favorite setting is made is evaluated. If a favorite setting is not made for the image file, the evaluation values of the image file are calculated without using its rating in step S1004.

In addition, in step S1004, the layout data generation function 301 evaluates the image file with respect to the plurality of evaluation items based on a priority order illustrated in FIG. 11. The priority order is determined such that an index indicating the preference of the user ranks higher. The present exemplary embodiment, however, is not limited to this. As an evaluation method corresponding to the priority order, for example, weighted addition is performed on the evaluation result of each of the plurality of evaluation items according to the evaluation order, and obtained result is regarded as an evaluation value for one condition.

As described above, if the evaluation values of the image are calculated in step S1004, the processing proceeds to step S1005. In step S1005, the layout data generation function 301 determines whether the processing in steps 1002 to 1004 are performed on all of the plurality of conditions in the layout data generation condition 302. If there is a layout data generation condition of the next ID (YES in step S1005), the layout data generation function 301 advances the ID of the condition to be processed to the next ID, and the processing returns to step S1002.

After the evaluation values are calculated with respect to all the layout data generation conditions by the processing in steps 1002 to 1004 (NO in step S1005), the processing proceeds to step S1006. In step S1006, the layout data generation function 301 selects the layout data generation condition having the highest evaluation. Then, in step S1007, the layout data generation function 301 selects, from among images stored in the HD 107 as candidates to be arranged on a template an image corresponding to the layout data generation condition selected in step S1006 as a target to be arranged on a template.

According to the present exemplary embodiment, an image having a high evaluation with respect to the evaluation items illustrated in FIG. 11 is determined to be arranged on a template (i.e., an output target). Thus, an image preferred by the user can be preferentially output. In other words, it is highly likely that the user prefers an image for which a rating has been set, or an image having a large number of times of printing or viewing. Thus, an image having a high evaluation with respect to these items is preferentially determined as the output target.

At the time when the layout data generation function 301 determines in step S1003 that there is an image file that matches the layout data generation condition, the layout data generation function 301 may select the image file as the target to be arranged on a template. Further, if any of the evaluation values of the image file calculated in step S1004 is higher than a predetermined value, the layout data generation function 301 may select the image file to be arranged on a template by omitting the processing in steps S1005 and S1006.

As illustrated in FIG. 10, the layout data generation function 301 selects an image to be arranged on a template in a case where the image matches a layout data generation condition and has a high evaluation value.

Next, template selection processing performed by the layout data generation function 301 is described. By this processing, a template is selected to which the image selected by the processing illustrated in FIG. 10 is arranged.

According to the present exemplary embodiment, to select a template corresponding to a layout data generation condition, the IDs of conditions corresponding to the template is described in the file of each template.

FIG. 9 illustrates an example of a file configuration of the template 303. The template 303 includes a metadata portion 901 and a template portion 902. The template portion 902 includes coordinate information regarding an arrangement area for laying out an image 903 and an image 904. The template portion 902 also includes coordinate information regarding an arrangement area for laying out a text 905, image data of a design image 906, and coordinate information regarding the design image 906.

The metadata portion 901 includes ID information corresponding to the layout data generation condition 302. The configuration of the metadata portion enables the selection of a template corresponding to the layout data generation condition 302. As illustrated in FIG. 9, a plurality of IDs may be described so that the template 303 corresponds to a plurality of conditions. For example, the metadata portion 901 of a template for a birthday may include description of condition IDs corresponding to the respective birthdays of "father", "mother", and "son" so that the template for a birthday corresponds to the birthdays of a plurality of people. Consequently, the same template can be used for a plurality of people, so that an appropriate template can be selected without storing a template for each of the birthdays of a plurality of people.

The content of the metadata portion 901 may be stored in the host computer 100, or may be stored in an external apparatus, as a text file described, for example, in the XML format. In this case, the content of the metadata portion 901 is appropriately transmitted from the external apparatus to the host computer 100. For example, when the layout data generation function 301 generates layout data, or when the application software 101 is started, the host computer 100 obtains the text of the metadata portion 901 from the external apparatus. If the metadata portion 901 is thus stored in the external apparatus, it is easy to replace or edit data.

Figure 12:
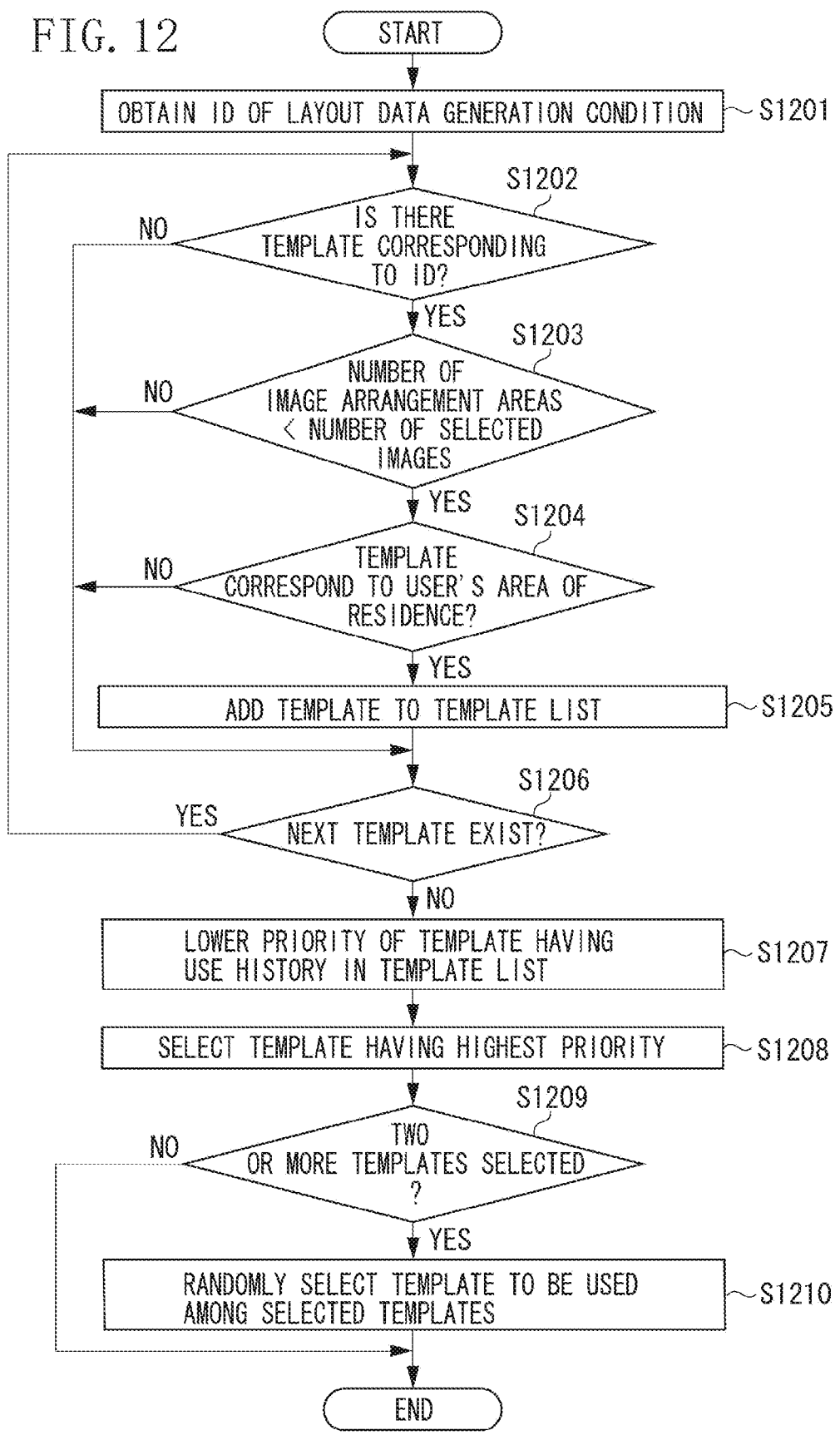
FIG. 12 is a flow chart illustrating an example of template selection processing.

FIG. 12 is a flow chart illustrating a processing procedure of the template selection processing performed by the layout data generation function 301 illustrated in FIG. 3. This process is achieved by the CPU 108 executing a program corresponding to the layout data generation function 301 in FIG. 3 which is stored in the HD 107 or the ROM 110.

In step S1202, the layout data generation function 301 determines whether an ID described in the metadata portion 901 of the template matches the condition ID obtained in step S1201.

In step S1202, if the layout data generation function 301 determines that the condition ID is described in the template (YES in step S1202), then in step S1203, the layout data generation function 301 compares the number of image arrangement areas stored in the template with the total number of the image files selected in step S1002 in FIG. 10. If the number of the image arrangement areas is equal to or greater than the number of the selected image files (NO in step S1203), the processing proceeds to step S1206, so as not to select the template. Accordingly, it is possible to prevent the generation of a blank image arrangement area when layout data is generated in which an image file is arranged.

In step S1203, if the layout data generation function 301 determines that the number of the image arrangement areas is smaller than the number of the selected image files (YES in step S1203), then in step S1204, the layout data generation function 301 obtains information about a user's residential area and determines whether the template corresponds to the user's residential area. For example, when layout data is printed in which an image is arranged on a template of which size corresponds to an L-size in terms of a sheet size, it may not be possible to appropriately print the layout data in an area where L-size sheets are not used. Thus, in step S1204, the layout data generation function 301 does not select the template which does not correspond to the user's residential area.

The information indicating the user's residential area is extracted by a device management application stored in the host computer 100. Then, the layout data generation function 301 obtains the information about the user's residential area extracted as described above. In addition, an area corresponding to the template is described in the metadata portion 901 of the template 303. In step S1204, the layout data generation function 301 compares the user's residential area with the area described in the template, and determines whether the template corresponds to the user's residential area.

In step S1204, if the layout data generation function 301 determines that the template corresponds to the user's residential area (YES in step S1204), then in step S1205, the layout data generation function 301 adds the template to a template list as a candidate of an output target. Subsequently, in step S1206, if the layout data generation function 301 determines that there is a next template (YES in step S1206), the processing returns to step S1202. Through the determination processing in step S1206, the layout data generation function 301 performs the processing in steps 1202 to 1205 on all the templates stored in the HD 107 or the ROM 110. Accordingly, among all the templates, templates that match the conditions in steps 1202 to 1204 are added to the template list.

Then, in step S1207, if the template list generated in step S1205 includes a template that is not yet used according to its usage history, the layout data generation function 301 extracts a template that has been used in the past according to its usage history, and performs processing for lowering the priority of the extracted template. More specifically, in step S1207, the layout data generation function 301 determines whether the template list generated in step S1205 includes a template that is not yet used according to its usage history. The usage history is, for example, the history of use of the template with respect to the ID of the layout data generation condition obtained in step S1201.

In other words, if layout data is output a plurality of times according to the timing information of the same layout data generation condition, a template that is not used until the output of the layout data is identified in the template list. Then, if the template list includes a template that is not yet used according to its usage history, the priority of a template that has been used according to its usage history is made lower than the priority of the template that is not yet used according to its usage history. Consequently, a template that is not yet used according to its usage history will be selected in step S1208. Thus, when layout data pieces having a plurality of patterns can be generated from a plurality of templates, it is possible to preferentially output a template that the user has not viewed among the plurality of templates. If the template list does not include a template that is not yet used according to its usage history, in other words, if all the templates in the template list have been used, the layout data generation function 301 selects a template among the used templates without performing the processing for lowering the priority.

In step S1208, the layout data generation function 301 selects a template having the highest priority. Then, in step S1209, if the layout data generation function 301 determines that two or more templates are selected in step S1208 (YES in step S1209), the processing proceeds to step S1210. For example, if the template list includes a plurality of templates that are not yet used according to their usage histories (templates to be used for the first time), the processing proceeds to step S1210. In step S1210, the layout data generation function 301 randomly selects one template to be used from among the templates selected in step S1208.

In step S1207, the layout data generation function 301 determines the priority order of templates based on whether a template has been used according to its usage history, that is, whether a template has been used to generate layout data. The determination of the priority order, however, is not limited to this method. Alternatively, the priorities of templates may be weighted based on the number of times of use of the templates. Thus, even if a plurality of templates have been used according to their usage histories in the processing in steps 1208 to 1210, it is possible to preferentially select a template having a small number of times of use among the plurality of templates.

As described above, the layout data generation function 301 can select an image preferred by the user as a target to be arranged on a template by the processing illustrated in FIG. 10. In addition, by the processing illustrated in FIG. 12, the layout data generation function 301 can select a template which is not used by the user as an output target. Thus, the layout data generation function 301 arranges an image preferred by the user to an unused template to generate layout data. The layout data presentation function 307 presents the thus generated layout data to the user. Then, if the user issues an instruction to print the presented layout data, the printer 105 prints an image corresponding to the layout data on a printing medium. Alternatively, if the user issues an instruction to store the presented layout data, the HD 107 stores the layout data as one file. Thus, an image that the user desires to output can be output in a variety of layouts.

In the above-described exemplary embodiment, to select an image and a template as output targets, an image and a template are selected by a combination of conditions having a plurality of items including a person and an event. Thus, based on the processing according to the above exemplary embodiment, it is possible to generate layout data in which an image related to a particular person and a particular event is arranged on a template appropriate for the person and the event.

Particularly, according to the above-described exemplary embodiment, the date/time information corresponding to the person and the event related to an image is compared with the date and time (the current date and time) of outputting the layout data, thus an image and a template corresponding to the current date and time can be selected. Therefore, according to the above-described exemplary embodiment, layout data in which an image that matches the current date and time is arranged on a template suitable for the image can be presented to the user.

In the above description, to select a template to be output, a template is selected based on the ID of the layout data generation condition. Next, an example is described as a second exemplary embodiment in which a template is selected based on a keyword of a layout data generation condition.

The template 303 according to the present exemplary embodiment stores in the metadata portion 901 one or more keywords indicating for what purpose of use the template 303 has been generated. Further, a person and an event corresponding to the layout data generation condition 302 serve as keywords corresponding to the layout data generation condition 302. Then, the layout data generation function 301 compares the keywords of the template 303 with the keywords in information included in layout data generation conditions to select a template. As a condition for selecting a template, an example for using printer information of a printer used by a user is also described in addition to the conditions in the template selection processing in FIG. 12.

Figure 13:
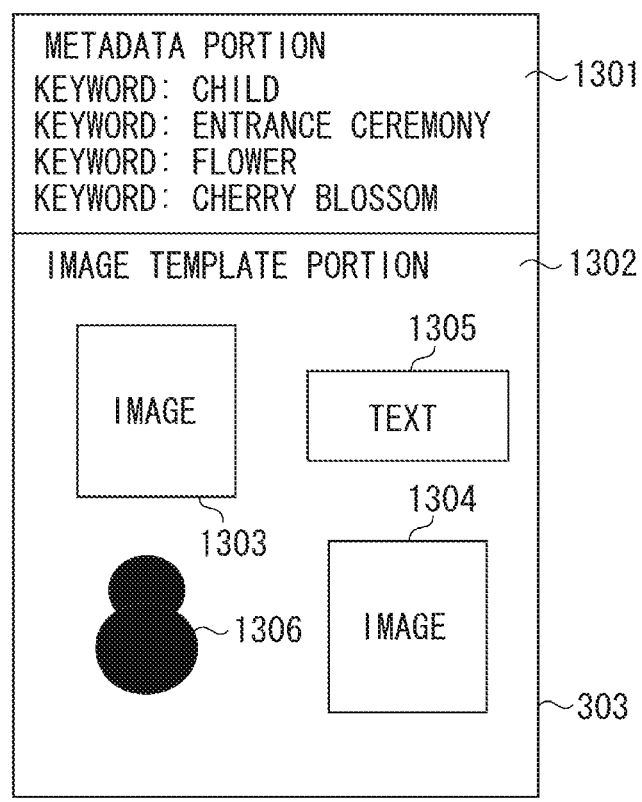
FIG. 13 illustrates an example of a configuration of a template.

FIG. 13 illustrates an example of the configuration of the template 303. The template 303 includes a metadata portion 1301 and a template portion 1302. The metadata portion 1301 stores one or more keywords indicating for what purpose of use the template 303 has been generated. The template 303 illustrated in FIG. 13 is a template expected to be used for, for example, a child's entrance ceremony. It is indicated that the template is generated under the theme of flowers and cherry blossoms. The template portion 1302 is similar in configuration to the template portion 902 in FIG. 9.

Figure 14A:
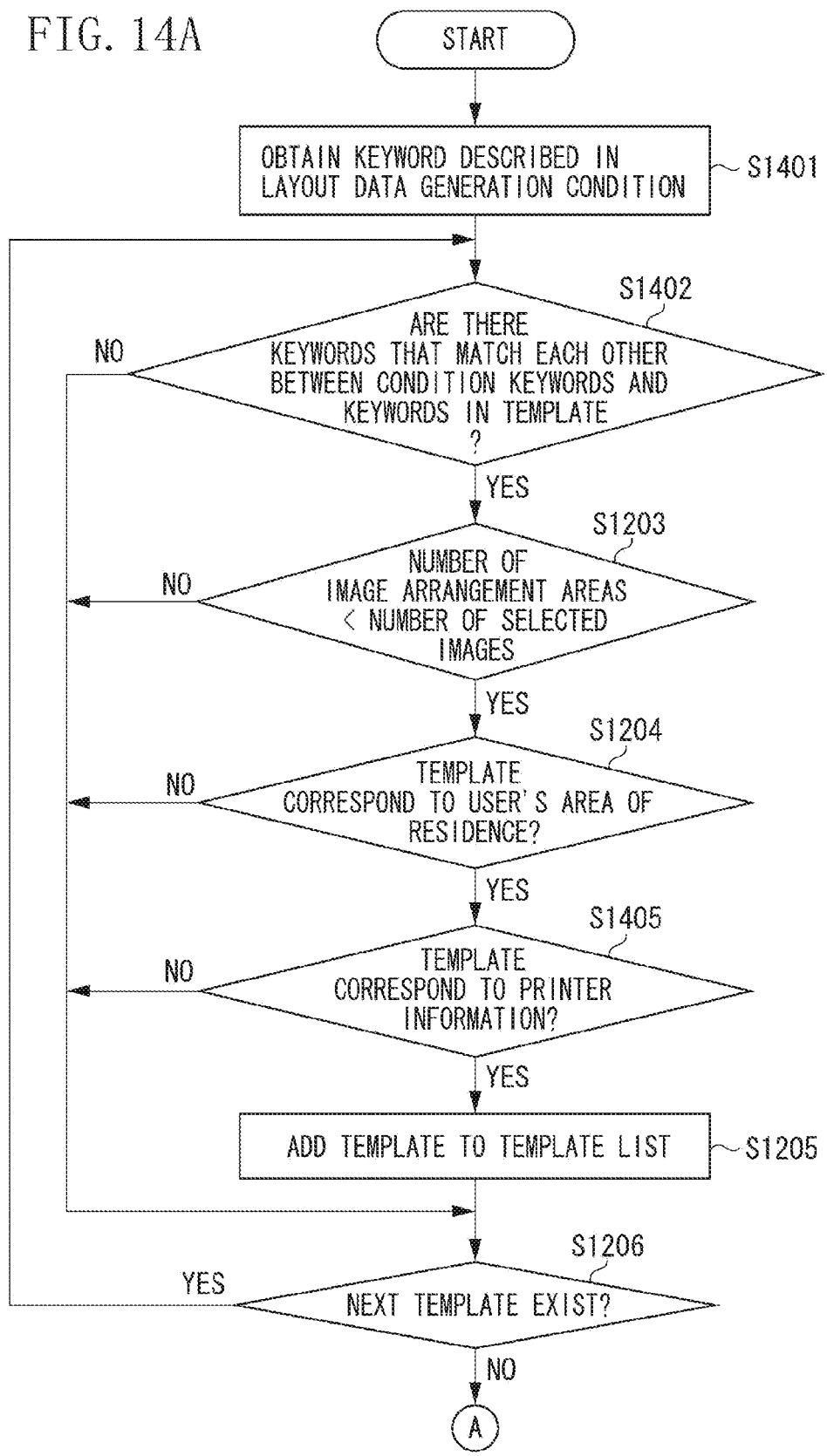
FIGS. 14A and 14B together comprise a flow chart illustrating an example of template selection processing.
Figure 14B:
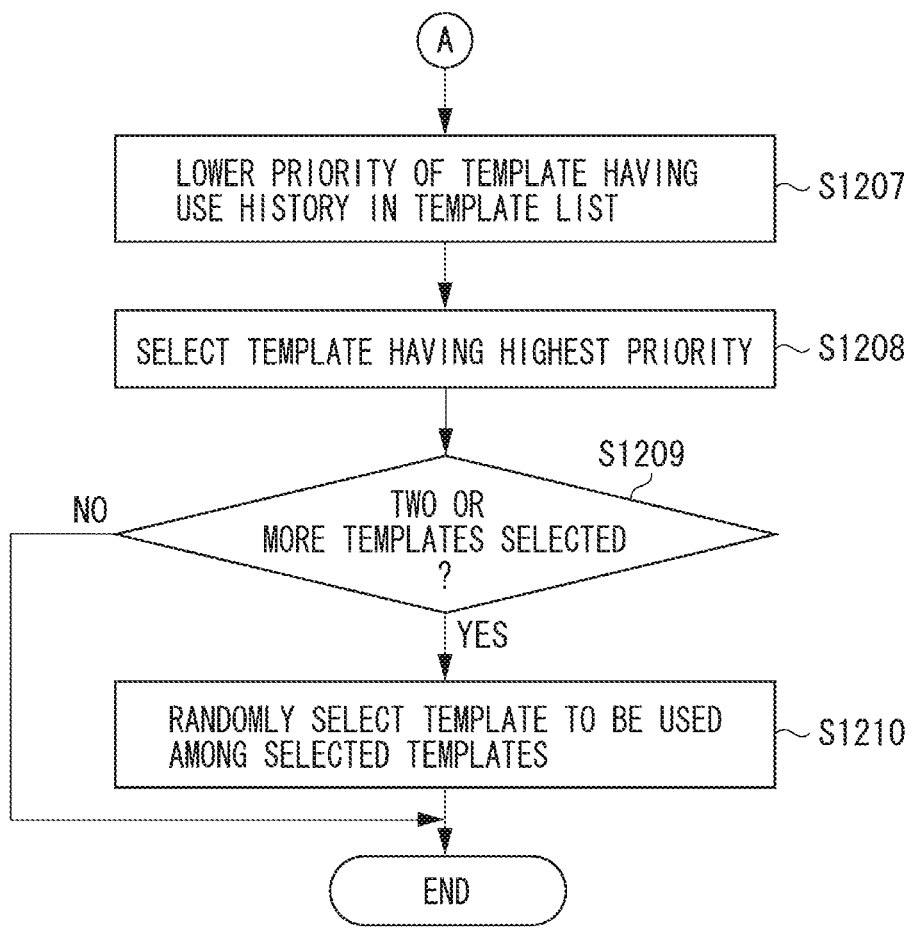

FIG. 14 (including FIGS. 14A and 14B) is a flow chart illustrating a example of the template selection processing performed by the layout data generation function 301. In FIG. 14, the processing similar to those described in FIG. 12 are denoted by the same step numbers, and the descriptions thereof are omitted here.

In step S1401, the layout data generation function 301 sets as condition keywords the keywords described in the layout data generation condition selected in step S1006 in FIG. 10. The keywords described in the selected layout data generation condition are, for example, the target person "father" and the event "birthday" in the layout data generation condition of the ID 001 in FIG. 8.

In step S1402, the layout data generation function 301 compares the keywords described as metadata in the template with the condition keywords obtained in step S1401, and determines whether there are keywords that match each other. In step S1402, if the layout data generation function 301 determines that there are keywords that match each other between the keywords described in the template and the condition keywords (YES in step S1402), the layout data generation function 301 performs the processing in step S1203 and the subsequent steps. In steps S1203 and S1204, the processing similar to those in FIG. 12 are performed.

In step S1405, the layout data generation function 301 obtains printer information indicating a state and a capability of a printer used by the user, and determines whether the template corresponds to the printer information. The printer information is extracted from the printer 105 by the device management application stored in the host computer 100. Then, the layout data generation function 301 obtains the printer information extracted as described above. In addition, the capability and the state of the printer corresponding to the template is described in the metadata portion 901 of the template 303. In step S1405, the layout data generation function 301 compares the printer information with information described in the template, and determines whether the template corresponds to the capability and the state of the printer 105.

FIG. 15 illustrates examples of the printer information and template selection criterion based on the printer information. As illustrated in FIG. 15, the layout data generation function 301 obtains as the printer information a sheet size which can be used for printing in the printer 105 used by the user, and select a template corresponding to the sheet size. Alternatively, the layout data generation function 301 may obtain as the printer information a sheet size which is used for printing in the past according to its history in the printer 105 used by the user, and select a template corresponding to the sheet size. Yet alternatively, the layout data generation function 301 may obtain as the printer information amounts of remaining ink of the printer 105 used by the user, and select a template that mainly uses the color of an ink having a sufficient amount of remaining ink. In steps S1205 to S1210, the processing similar to those in FIG. 12 are performed, and therefore, the descriptions thereof are omitted.

As described above, in the example illustrated in FIG. 14, a template is selected using as keywords a person and an event to be output. Thus, it is possible to select a template that matches a layout data generation condition without matching an ID described in the template with the ID of the layout data generation condition as in the processing illustrated in FIG. 12. Therefore, when a layout data generation condition and a template are added, it is possible to easily select the newly added template based on the newly added layout data generation condition.

Next, an example is described as a third exemplary embodiment in which a user newly adds a layout data generation condition. In this example, the user issues an instruction using any of the operation devices, to add keywords.

For example, when an image file is stored in the image database 306, the user inputs event information by operating any of the operation devices, and registers the event information in the ancillary information of the image file. As illustrated in FIG. 7, it is assumed that the user registers an event having then event name "cherry blossom viewing with family", the event category "travel", and the event occurrence date "2012/4/1". As a result, a layout data generation condition corresponding to the event information is newly added.

FIG. 16 illustrates the layout data generation condition having the keywords registered by the user. As a result of the user registering the event, a condition 1601 in FIG. 16 is added as the layout data generation condition. If information registered as an event by the user is added to the layout data generation condition 302, the timing information is uniformly set as "one month after event occurrence, year not considered". The timing information, however, may be set according to the event information input by the user. For example, if the event category "travel" is selected, the timing information "two months after event occurrence, year not considered" may be set. Alternatively, if the event category "birthday" is selected, the timing information "one month before and after birthday, year not considered" may be set.

Then, if a template describing the keyword "cherry blossom viewing with family" is stored, the template is selected under the condition 1601. Thus, the user can register, in an image, keywords (a person and an event) for a template, and add the keywords as a layout data generation condition. Therefore, when layout data is generated using an image file related to an event registered by the user, it is possible to generate the layout data using a more appropriate template.

According to the above-described exemplary embodiments, when layout data is generated, an image to be output and a template on which the image is arranged are selected based on a combination of a plurality of types of attributes of an image, such as a person included in the image and an event related to the image. Thus, it is possible to select an appropriate template for an image to be output, and present, to the user, layout data in which the image to be output is arranged on the template.

Further, according to the above-described exemplary embodiments, the date/time information corresponding to the attributes of an image, such as a person and an event, is compared with the date and time (the current date and time) of outputting the layout data, so that the attributes of an image corresponding to the current date and time can be identified. Then, an image and a template are selected according to the attributes of the image, and therefore, it is possible to present, to the user, layout data in which the image that matches the current date and time is arranged on a template that matches the current date and time.

In the above description, an example is described in which, when a template is selected, a template is selected that corresponds to a combination of a plurality of types of attributes of an image, such as a person and an event. The exemplary embodiments, however, are not limited to this configuration. Alternatively, a template may be selected according to one type of an attribute, such as a person or an event. For example, if the attributes of an image include "birthday", a template corresponding to a birthday may be selected.

Further, the application software 101 described above for generating layout data may generate and output layout data at various timings. For example, the application software 101 may generate layout data when the host computer 100 is activated. Alternatively, the application software 101 may generate layout data according to an instruction issued by the user.

Further, as a method for outputting layout data, the layout data presentation function 307 may perform a method for causing the monitor 106 in FIG. 1 to display layout data in the form of a slideshow, or a method for causing the printer 105 to perform print output of layout data. A method for outputting layout data is not limited to the presentation to a user. For example, layout data may be stored as image data in the HD 107 of the host computer 100, or may be transmitted to an external apparatus.

According to the above-described exemplary embodiments, a photographic image photographed by a camera is described as an example of an object to be arranged on a template. The exemplary embodiments, however, are not limited to this example. Alternatively, an object may be vector data of a figure or text data. In this case, for example, the date/time information of the date and time when a file of a vector image or text data has been generated is obtained from the file as the photographing date and time described above.

Further, according to the above-described exemplary embodiments, a person included in an image and an event related to the image is described as examples of information pieces about the image. The exemplary embodiments, however, are not limited to this example. Alternatively, for example, in the case of figure data and a text image, the outlines and the generation dates and times of the figure and the text may be registered. At this time, based on a combination of the outlines and the generation dates and times of the figure and the text, a figure and text corresponding to the combination are selected, and also a template corresponding to the combination is selected.

Further, according to the above-described exemplary embodiments, an image and a template are selected based on information indicating both a date and a time, such as the current date and time and the photographing date and time of an image. The exemplary embodiments, however, are not limited to this example. Alternatively, an image and a template may be selected according to information regarding a date such as the current date or the photographing date of an image without considering a time, or may be selected according only to a time.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trade mark)), a flash memory device, a memory card, and the like.

A program code for implementing the functions according to the present exemplary embodiments may be executed by one computer (a CPU or a micro processing unit (MPU)), or may be executed with the cooperation of a plurality of computers. Further, the program code may be executed by a computer, or hardware may be provided such as a circuit for implementing the functions of the program code. Alternatively, a part of the program code may be implemented by hardware, and a program corresponding to the remaining part may be executed by a computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2012-153677, filed Jul. 9, 2012, which is hereby incorporated by reference herein in its entirety.

What is claimed is:

1. An apparatus comprising:
at least one memory configured to store at least one program; and
at least one processor configured to execute the at least one program to cause the apparatus to
specify a person in one or more images among a plurality of images, by analyzing the plurality of images;
first register the person and a date corresponding to the person, in a memory, in accordance with an instruction by a user;
second register an image including the person, with the person, in the memory, wherein in the memory, the date is related to the person and the image is related to the person;
determine an output target date corresponding to a predetermined output timing, from a plurality of dates registered in the memory, in accordance with the first registration;
determine an output target person corresponding to the output target date, from a plurality of persons related to the plurality of dates in the memory, in accordance with the first registration;

select an output target image which is related to the output target person in the memory, in accordance with the second registration; and output the output target image to a display apparatus or a printing apparatus.

2. The apparatus according to claim 1, wherein the at least one processor is further configured to execute the at least one program to cause the apparatus to generate layout data in which the output target image is arranged on a template, and output the generated layout data.

3. The apparatus according to claim 2, wherein the at least one processor is further configured to execute the at least one program to cause the apparatus to, in a case where the layout data includes layout data pieces having a plurality of patterns corresponding to the predetermined output timing, determine an output target from among the layout data pieces having the plurality of patterns based on an image to be arranged in the layout data pieces having the plurality of patterns, and output the layout data as the output target.

4. The apparatus according to claim 3, wherein the at least one processor is further configured to execute the at least one program to cause the apparatus to determine the layout data as the output target based on the number of images selected for each of the layout data pieces having the plurality of patterns and the number of image arrangement areas in the template.

5. The apparatus according to claim 3, wherein the at least one processor is further configured to execute the at least one program to cause the apparatus to determine the layout data as the output target based on at least one of: a user's evaluation with respect to an image selected for each of the layout data pieces having the plurality of patterns, and the number of output times of the image.

6. The apparatus according to claim 2, wherein the at least one processor is further configured to execute the at least one program to cause the apparatus to select a template corresponding to the person, and generate layout data in which the output target image is arranged on the selected template.

7. The apparatus according to claim 6, wherein the at least one processor is further configured to execute the at least one program to cause the apparatus to, based on usage histories of a plurality of templates, select from among the plurality of templates a template to be used in the layout data to be output.

8. The apparatus according to claim 1, wherein the at least one processor is further configured to execute the at least one program to cause the apparatus to obtain a current date/time as the predetermined output timing, and determine the output target date based on the obtained date/time.

9. The apparatus according to claim 1, wherein the at least one processor is further configured to execute the at least one program to cause the apparatus to cause the display apparatus to display the image.

10. The apparatus according to claim 1, wherein the at least one processor is further configured to execute the at least one program to cause the apparatus to cause the printing apparatus to print the image.

11. The apparatus according to claim 1, wherein the at least one processor is further configured to execute the at least one program to cause the apparatus to register an event date of an event with the person, as the date.

12. A method comprising:

specifying a person in one or more images among a plurality of images, by analyzing the plurality of images;

first registering the specified person and a date corresponding to the person, in a memory, in accordance with an instruction by a user;

second registering an image including the registered person, with the person, in the memory, wherein in the memory, the date is related to the person and the image is related to the person, by the first registering and the second registering;

first determining an output target date corresponding to a predetermined output timing, from a plurality of dates registered in the memory, in accordance with the first registering;

second determining an output target person corresponding to the output target date, from a plurality of persons related to the plurality of dates in the memory, in accordance with the first registering;

selecting an output target image which is related to the determined output target person in the memory, in accordance with the second registering; and outputting the selected output target image to a display apparatus or a printing apparatus.

13. The method according to claim 12, wherein in the outputting step, layout data is generated in which the output target image selected is arranged on a template, and the generated layout data is outputted.

14. The method according to claim 13, further comprising:

determining, in a case where layout data pieces having a plurality of patterns corresponding to the predetermined output timing are generated, an output target from among the layout data pieces having the plurality of patterns based on an image to be arranged in the layout data pieces having the plurality of patterns; and outputting the layout data determined as the output target.

15. The method according to claim 14, wherein the layout data determined as the output target is determined based on the number of images selected for each of the layout data pieces having the plurality of patterns and the number of image arrangement areas in the template.

16. The method according to claim 14, wherein the layout data determined as the output target is determined based on at least one of: a user's evaluation with respect to an image selected for each of the layout data pieces having the plurality of patterns, and the number of times of output of the image.

17. The method according to claim 13, further comprising:

selecting a template corresponding to the output target person, wherein the layout data is generated in which the output target image is arranged on the template selected.

18. The method according to claim 17, wherein, based on usage histories of a plurality of templates, a template to be used in the layout data to be output is selected from among the plurality of templates.

19. The method according to claim 12, further comprising:

obtaining a current date/time as the predetermined output timing and determining whether the image is to be output based on the obtained date/time and the timing information; and outputting the image in a case where it is determined that the image is to be output.

20. The method according to claim 12, wherein the image is displayed on the display apparatus.

21. The method according to claim 12, wherein the image is printed on the printing apparatus.

22. The method according to claim 12, wherein in the first registering, an event date of an event is registered with the person, as the date.

23. A non-transitory storage medium storing a program for causing a computer to execute a method, the method comprising:

specifying a person in one or more images;

first registering the person and a date corresponding to the person, in a memory, in accordance with an instruction by a user;

second registering an image including the registered person, with the person, in the memory, wherein in the memory, the date is related to the person and the image is related to the person, by the first registering and the second registering;

first determining an output target date corresponding to a predetermined output timing, from a plurality of dates registered in the memory, in accordance with the first registering;

second determining an output target person corresponding to the output target date, from a plurality of persons related to the plurality of dates in the memory, in accordance with the first registering;

selecting an output target image which is related to the determined output target person in the memory, in accordance with the second registering; and outputting the selected output target image to a display apparatus or a printing apparatus.

24. The non-transitory storage medium according claim 23, wherein, in the first registering, the specified person and a date corresponding to the specified person are registered.

25. An apparatus comprising:
at least one memory configured to store at least one program; and at least one processor configured to execute the at least one program, wherein the at least one processor specifies a person in one or more images, first registers the person and a date corresponding to the person, in a memory, in accordance with an instruction by a user, second registers an image including the registered person, with the person, in the memory, wherein in the memory, the date is related to the person and the image is related to the person, determines an output target date corresponding to a predetermined output timing, from a plurality of dates registered in the memory, in accordance with the first registration, determines an output target person corresponding to the determined output target date, from a plurality of persons related to the plurality of dates in the memory, in accordance with the first registration, selects an output target image which is related to the determined output target person in the memory, in accordance with the second registration, and outputs the selected output target image to a display apparatus or a printing apparatus.

* * * * *